United States Patent [19]

Vandenberg et al.

[11] Patent Number: 4,715,321

[45] Date of Patent: Dec. 29, 1987

[54] MILKING PARLOR STALL CONSTRUCTION WITH OVERHEAD GATES

[76] Inventors: August Vandenberg, 1904 Trotter Trail, Norco, Calif. 91760; Ben W. Vandenberg, 17224 Gard Ave., Artesia, Calif. 90701; Andrew W. Vandenberg, 15751 Ryon St.; Ben E. Haws, 8828 Laurel St., both of Bellflower, Calif. 90706

[21] Appl. No.: 889,515

[22] Filed: Jul. 25, 1986

[51] Int. Cl.⁴ ............................................. A01K 1/12
[52] U.S. Cl. ................................................. 119/14.03
[58] Field of Search ....................... 119/14.03, 14.04; 49/199, 200

[56] References Cited

U.S. PATENT DOCUMENTS

| | | | |
|---|---|---|---|
| 2,754,604 | 7/1956 | Hill | 49/199 |
| 3,362,127 | 12/1982 | Nielsen et al. | 119/14.03 |
| 3,810,442 | 5/1974 | Jacobs et al. | 119/14.03 |
| 4,194,467 | 3/1980 | Nielsen et al. | 119/14.03 |
| 4,419,961 | 12/1983 | Vanderberg et al. | 119/14.03 |
| 4,508,059 | 4/1985 | Anderson | 119/14.03 |
| 4,513,687 | 4/1985 | De Jong | 119/14.03 X |

*Primary Examiner*—William F. Pate, III
*Assistant Examiner*—Creighton Smith
*Attorney, Agent, or Firm*—Cislo & Thomas

[57] ABSTRACT

An improved milking parlor construction is provided for barns of limited floor space, comprising the combination of a modular unit which comprises a module which may be utilized in fabricating milking parlors of the type wherein a central pit area has juxtapositioned on either side a cattle stand wherein each of the modules is composed of at least two space-apart, hollow vertical upright members that may be supported in concrete or the like and from each of which a feed bowl and shroud may be hung. The feed bowl is provided with feed from a feed conveyor superpositioned over the hollow vertical upright member and in communication therewith. In order to accommodate limited floor space considerations, the module also includes at least a pair of vertically raisable gates attached to the vertical upright members. A mechanism is provided for raising and lowering at least pairs of gates. One or a plurality of the gates defining a cattle station at which the cattle are milked and, incidentally fed, provides easy egress for the cattle to the exit corridor to leave the milking parlor structure.

22 Claims, 15 Drawing Figures

MILKING PARLOR STALL CONSTRUCTION WITH OVERHEAD GATES

BACKGROUND OF THE INVENTION

This invention pertains to milking parlor structures, and, more particularly, to an improved milking parlor construction over that conventionally found in the prior art.

The prior art is well aware of milking barn constructions or parlors of the modern type wherein a milking pit is sandwiched between juxtapositioned cattle stands wherein cattle are allowed to enter the milking parlor structure to be milked and to incidentally be fed. The feeding acts as an enticement to attract the individual dairy cattle to the individual stations at which milking of the cow may take place.

Exemplary of prior art structures is U.S. Pat. No. 4,419,961 to Vandenberg et al, which discloses a milking parlor construction including a basic module that comprises a hollow vertical upright member from which the feed bowl and accompanying shroud and individual exit gates forming the individual milking stations may be hung, wherein the vertical member is securely supported in concrete or, alternatively, supported through a plate and bolt mechanism which in turn is tied to the concrete floor making up the milking parlor structure.

Additionally, the vertical upright member is of hollow construction and has superpositioned thereover a feed conveyor and the like which feeds fodder to the individual vertical upright members, which have communication to the feed bowls by which fodder may be fed thereto. Since the vertical uprights are of sturdy steel construction and have appropriately spaced tie-in support structure, a rigid end-structure results which is not easily misaligned due to the passage of cattle through the structure.

The exit gate is pivotally mounted on the hollow vertical upright member and is adapted to move between an open and a closed position. Means are provided to move the gate between the two positions.

While the milking parlor disclosed and claimed in the above-referenced patent is suitable for the purposes set forth therein, it is limited in its use to barns having a considerable amount of room to accommodate the outward movement of the exit gate. There are many milking barns that could take advantage of many of the other salient features of the claimed milking parlor, but which are too narrow to utilize the pivotal gate.

Thus, whether in existing milking barns containing space limitations or in new milking barns that are constrained to limited dimensions, there is a need to provide a milking parlor that utilizes the modular construction within a limited space.

OBJECTS AND SUMMARY OF THE INVENTION

Accordingly, it is an object of the present invention to provide an improved milking parlor construction that may be accommodated in a limited space.

It is another object of the present invention to provide an improved milking parlor construction wherein the same is made up of a modular unit, each unit provided with two spaced-apart, hollow vertical upright members from each of which a feed bowl and gate member may be mounted.

It is another even further important object of the present invention to provide an improved milking parlor construction having a basic modular unit involving hollow vertical upright members for supporting a vertically raisable gate.

It is another even further more specific important object of the present invention to provide an improved milking parlor construction comprising a central milk pit area and having adjacent cattle or milking stations formed by individual upright members of hollow configuration and having secured to each a feed bowl and a vertically upraisable gate mounted thereto, which gate member may be placed in either the upper open or lower closed positions, either in conjunction with another gate member or plurally.

It is another even further more specific and important object of the present invention to provide an improved milking parlor construction made up of a modular unit wherein each modular unit has two spaced-apart hollow vertical upright members from each of which are hung in securement a feed bowl member and a vertically upraisable gate member mounted thereto for movement into the upper open and lower closed positions and wherein two or a plurality of the gate members may be remotely controlled to be positioned into either the open or closed positions.

It is an even further and more important and specific object of the present invention to provide an improved milking parlor construction having a central pit area with adjacent cattle stands in juxtaposition thereto, wherein the cattle stands are formed by a plurality of hollow vertical upright members and each securely supporting a feed bowl member and a vertically upraisable gate member, which gate members may be operated in pairs or operated in the plurality at one time to either the open or closed positions.

Basically, in an exemplary embodiment, the invention is directed to a milking parlor construction comprising the combination of a module comprising two spaced-apart hollow vertical upright members adapted for securement in a base or the like. A feed bowl means is secured to each hollow vertical upright member and defines a cattle feed station. Feed is delivered to the feed bowl by a feed conveyor means superpositioned to the hollow vertical upright member. A gate member is vertically upraisable, mounted to each hollow vertical upright member and is adapted to move between an open and a closed position. Means to move at least two gate members into a selected one of the upper open and lower closed positions is provided.

Milking parlor barns may use a plurality of the modular units and associated upraising gates in conjunctions with a central milking pit and juxtapositioned milking stands so that feeding and milking of individual cattle on an individual or pluralistic basis is possible.

These and further objects of the invention will become more readily apparent from the hereinafter following commentary taken in conjunction with the drawings.

DESCRIPTION OF THE BEST EMBODIMENTS COMTEMPLATED

Referring now to the drawings, wherein like numerals of reference designate like elements throughout, it will be seen that a typical milking barn 2 is illustrated having exterior walls 4 with concrete floor 6 or the like and having a central milking pit 7 of rectangular configuration with juxtapositioned cattle stands 8 and exit corridors 10 leading to the outside of the structure 2.

The structure 2 is also provided with egress-entry doors 12 by which cattle may enter from a holding pen or wash facility (not shown) to the milking stands 8, as is known in the art.

Figure 1:
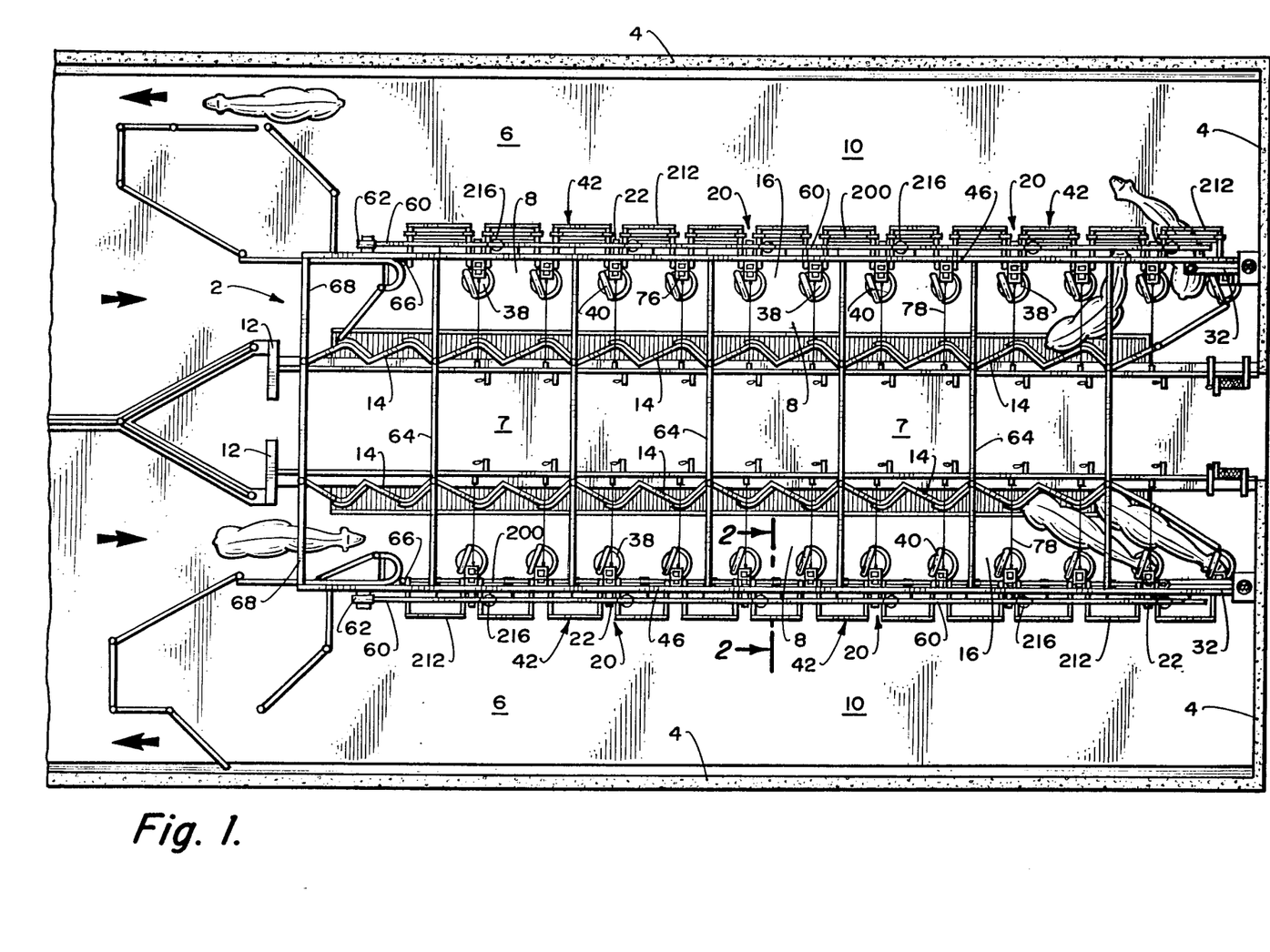
FIG. 1 is a top plan view illustrating the improved milking parlor of the invention with regard to conventional parlor barns.

Convolute splash shields 14 are also provided as is conventional so as to form a backstop for the individual cattle receiving stations 16 as best seen in FIG. 1.

Each of the cattle receiving viation 16 are formed in the cattle stands 8 in typical fashion and in conformity with the herein disclosed invention, a modular unit 20 forms the basic structure or member comprising at least two of the individual milking or feeding stations 16 in cooperation with the splash shield 14.

The individual module 20 is fabricated of two spaced-apart, hollow upright members 22, in this particular instance of heavy gauge steel of U-shaped configuration and being anchored in concrete floor 6 by means not shown.

Each hollow member 22 is of 12-gauge steel and is of 6 inch square tubular construction and may be provided with a see-through window at the top, as described in U.S. Pat. No. 4,419,961. The vertical members 22 have superpositioned thereover a conveyor member 32, in this particular instance having auger 34 to feed fodder and the like from supply hoppers (not shown) to the individual hollow vertical members 22, as described in the afore-mentioned Patent.

Hung from each member 22 is feed bowl 36 and encircling shroud 38 having entry pipe member 40 defining support structure to support the shroud 38 and to offer barrier protection against an individual cow damaging vertical member 22.

Figure 2:
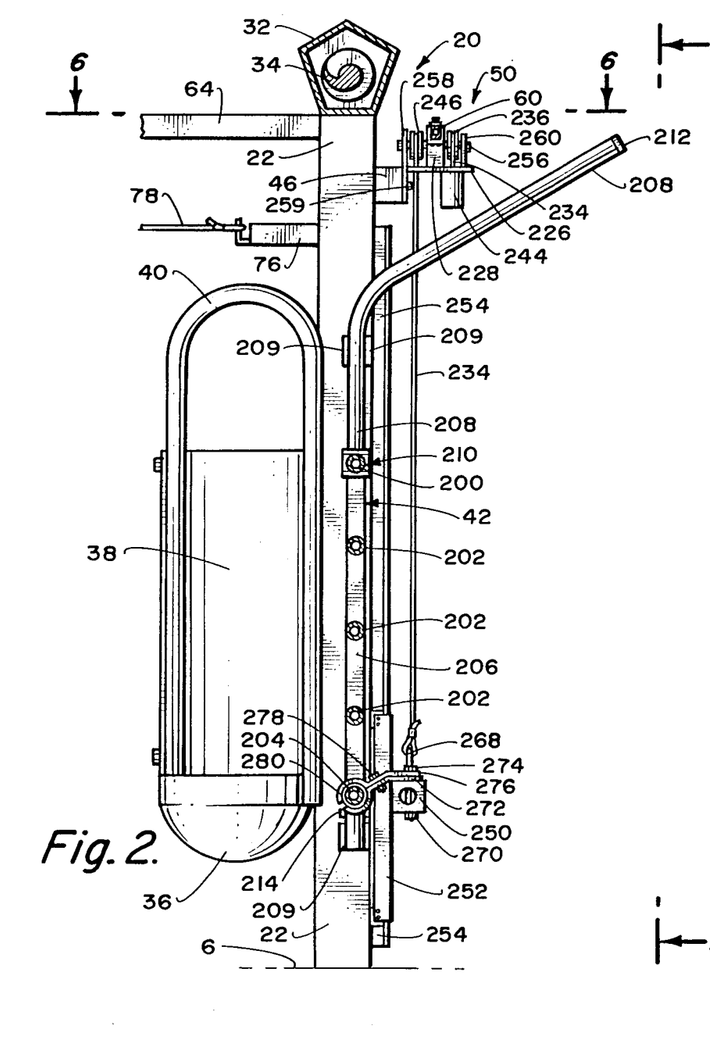
FIG. 2 is a side elevational view, partially in cross-section, taken along the line 2—2 of FIG. 1, showing the gate in the down, or closed, position.
Figure 4:
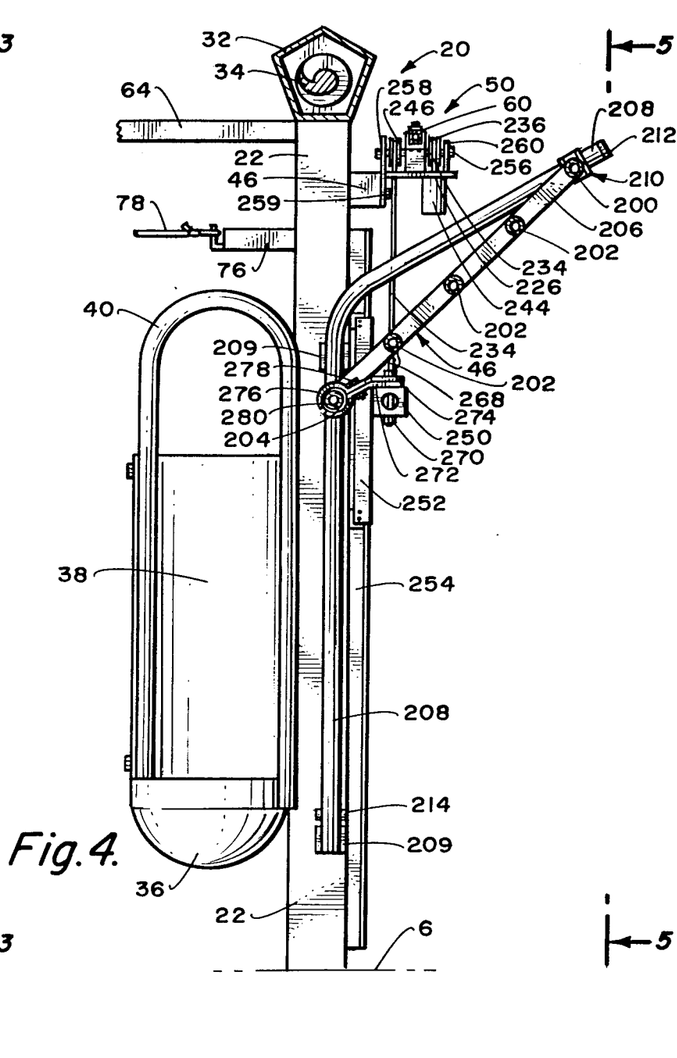
FIG. 4 is a view similar to that of FIG. 2, but showing the gate in the raised, or open, position.

Horizontally mounted chute member 76 is pulled to the open position (shown in FIGS. 2 and 4) by hand cord 78 attached to additional opening mechanism, as further described in the afore-mentioned Patent. Opening of the chute member 76 permits fodder and the like to drop into the feed bowl 36 from the conveyor member 27.

Suspended from each vertical member 22 in upwardly raisable supported fashion is gate member 42 fabricated of steel hollow pipe, weilded or otherwise secured, to form a barrier gate at each of the individual cattle stations 16. An axial box beam 46, which runs the extent of the milking parlor barn, is boiled or otherwise secured to the vertical member 22. The axial box beam 46 provides support for gate opening and closing mechanism 50.

The suspension of gate 42 from the vertical member 22 and the gate actuation mechanism 50 will be described in further detail below. Essentially, the gate mechanism 50 is adapted to convert horizontal linear movement by an elongate draw-rod member 60 into vertical linear movement so as to raise and lower gate member 42. The draw-bar 60 may be manually actuated or, in this particular instance, may be actuated by air cylinders 62 in order to open or close the individual gates 42.

As will be seen below, the gates 42 are opened in pairs (or, in some cases, in threes). In order to open the individual gates in pairs (or threes), manual opening gate means may be provided. Thus, the pairs of individual gates may be opened in tandem or all at one time or a pair of gates may be individually opened, if desired.

At spaced and appropriate places, cross-tie members 64 are utilized in order to rigidify the improved parlor construction of the invention. Also, appropriate and vertical members, such as 66, may be utilized where appropriate and needed, as for example, where support bars 68 are positioned at the entrances to the milking stands 8.

Figure 3:
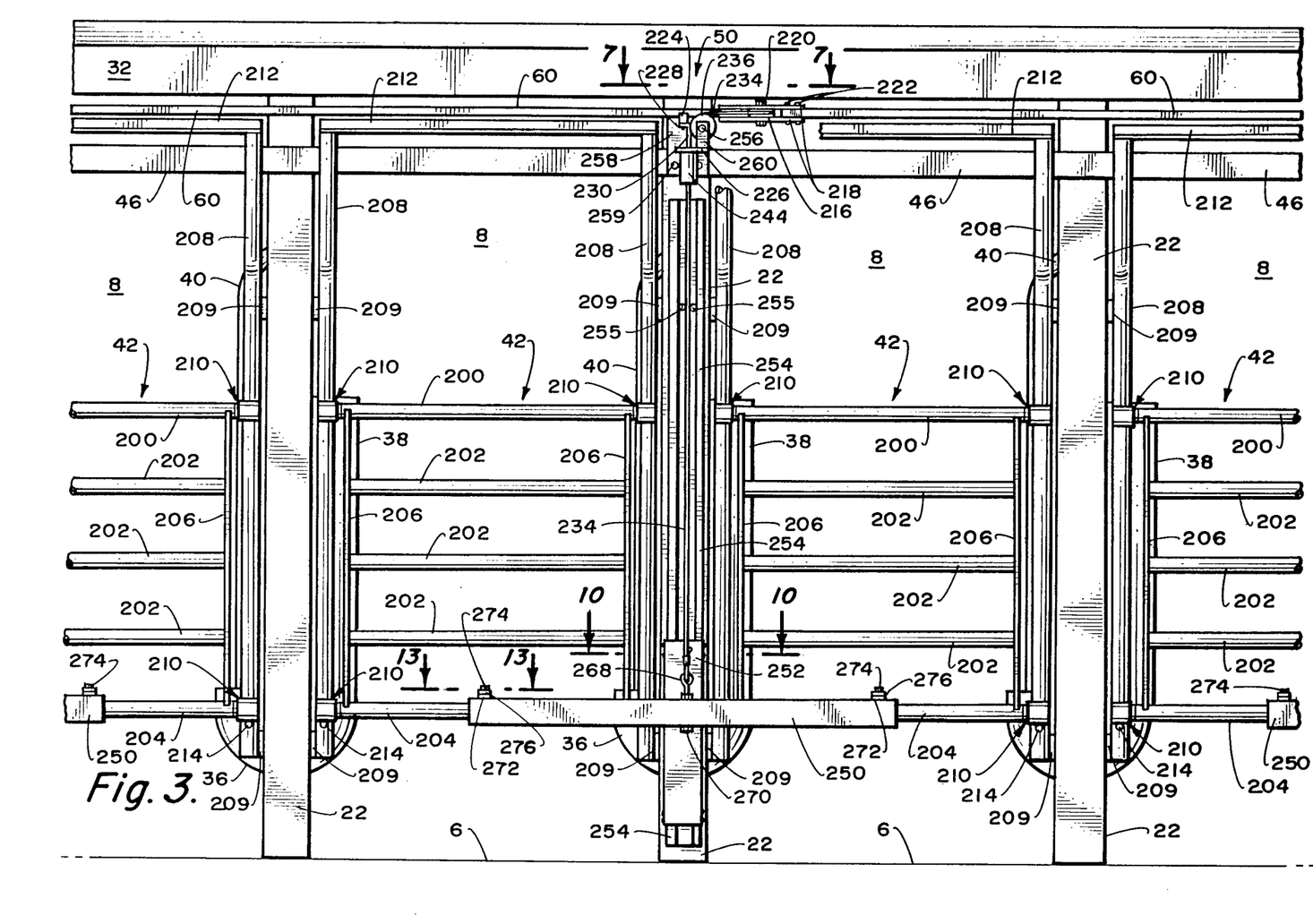
FIG. 3 is a front elevational view, taken along the line 3—3 of FIG. 2.

Referring now to FIG. 3, it will be seen that the gate 42 comprises a plurality of substantially equally spaced apart horizontal members, an upper horizontal member 200, at least one middle horizontal member 202 (three such middle members are depicted in FIGS. 2-5) and a lower horizontal member 204.

The middle horizontal members 202 are secured, such as by welding, to a pair of vertical side supports 206. The tops of the vertical side supports 206 are secured, as by welding, to the bottom surface of the upper horizontal member 200, while the bottoms of the vertical side supports 206 are likewise secured to the top surface of the lower horizontal member 204.

Alternatively, the middle bar members 202 may be vertically arranged, welded to upper 200 and lower 204 horizontal members.

A pair of vertical support guide pipes 208, curved at a location sufficiently high to permit cattle to pass through when the gate is raised, provide a support and guiding function for the gate 42. The vertical guide pipes may be secured, such as by bolts or by welding, to plates 209, in turn secured such as by bolts or welding, to the vertical upright members 22.

Upper and lower horizontal members 200 and 204, respectively, are provided with a U-shaped bushing member 210, which is rotatably secured in the ends of the members 200 and 204, which are hollow. The upper ends of the vertical support guide pipes 208 are secured by a cross-bar 212.

The angle of the bend of the guide pipes 208 is not particularly critical, other than the angle be sufficient so as to accommodate overhead clearance and not so sharp as to cause undue strain on the gate 42 and the gate actuation mechanism 50 during raising and lowering of the gate 42.

The U-shaped member 210 comprises two portions, such as by welding to the base thereof. The bight of the U-shaped portion 210a is provided with a low-friction material 210c, while the extension 210b is provided with a sleeve 210d of low-friction material. The low-friction material may comprise polyetrafluoroethylene, available under the trade designation "Teflon", nylon or other suitable material.

Figure 10:
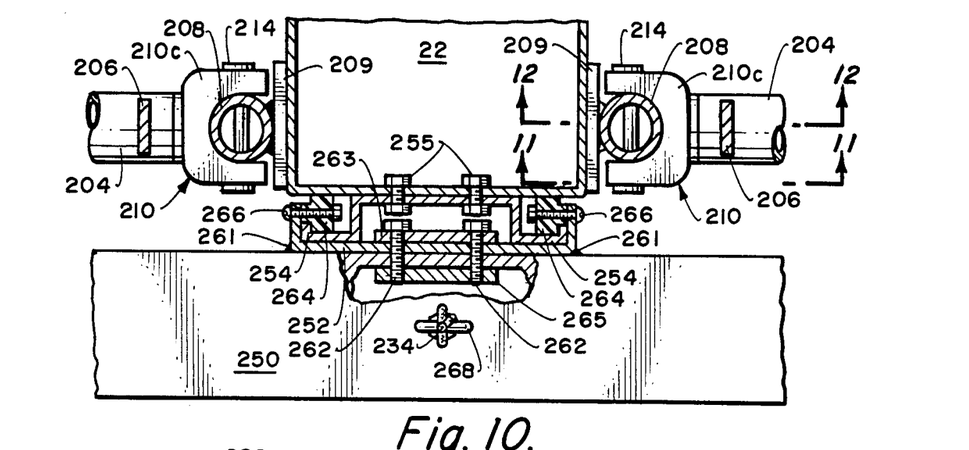
FIG. 10 is a top plan view of a portion of FIG. 3, partially in cross-section, taken along the line 10—10 of FIG. 3.
Figure 11:
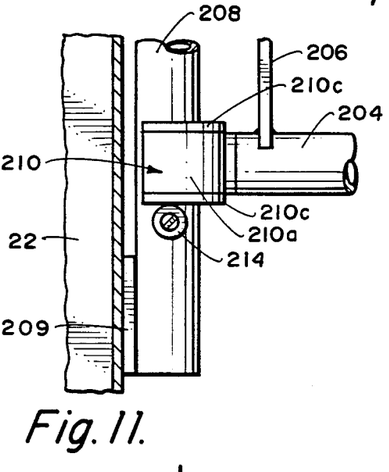
FIG. 11 is a side elevational view, partially in cross-section, taken along the line 11—11 of FIG. 10.
Figure 12:
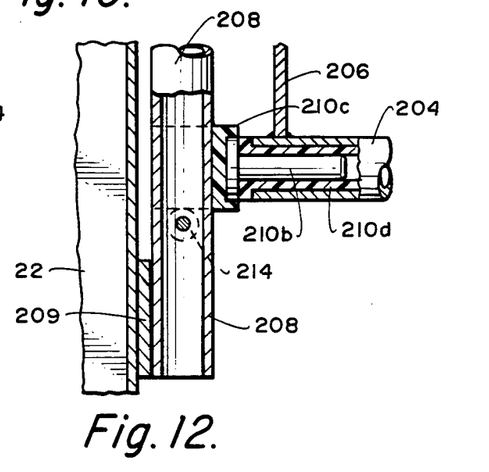
FIG. 12 is a cross-sectional view taken along the line 12—12 of FIG. 10.

The details of the coupling of the lower horizontal member 204 to the vertical support guide pipe 208 are depicted in FIGS. 10-12. The coupling of the upper horizontal member 200 to the vertical support guide pipe 208 is identical. Basically, the U-shaped portion of low-friction material 210c partially encompasses the vertical support guide pipe 208 to permit essentially frictionless movement therealong. The extension 210b and its sleeve 210d extend into the interior of the hollow tubes 200, 204 and provide essentially frictionless rotation of the bushing 210 with respect thereto during the raising and lowering of the gate 42.

An abutment stop 214 is provided, as shown in FIGS. 11-12, to ensure that the gate 42 stops at the appropriate location when lowered from its fully raised position and to provide a rest stop for the gate 42.

The gates 42 are raised and lowered by the axial actuation mechanism 50, which is supported by the axial box beam 46. The actuation mechanism 50 comprises the laterally movable draw-rod 60 to which is secured a plurality of horizontal travelling pulleys 216, one for each pair of cattle stands 8. In particular, pulley 216 is attached to draw-rod 60 via upper and lower straps 218, employing fastening means 220 through the center of the pulley and fastening means 222 through one end of a rod 60. The end of an adjacent draw-rod 60 is secured to the straps 218 by welding or other suitable means. An overall view of the actuating means 50 is depicted in FIG. 1, which details of the actuating means 50 are shown in FIGS. 6-9.

The draw-rod 60 is moved laterally either manually or by pneumatic air cylinder. Such an air cylinder 62 is schematically depicted in FIG. 1. The draw-rod 60 is supported periodically by a U-shaped bushing 224 comprising a low-friction material, such as "Teflon" or nylon, to permit sliding of the draw-rod 60 during actuation of gate actuation means 50. Bushing 224 is secured to and supported by horizontal plate 226 by an inverted L-shaped plate 228, in turn supported by vertical plate 230. The plates 228 and 230 are secured to each other and to the horizontal plate 226 such as by welding. The bushing 224 is conveniently attached to the plate 228 by means such as bolts 232.

A cable 234 engages the travelling pulley 216. One portion of the cable 234 passes over a first vertical pulley 236 through a first opening 238 in the horizontal plate 226 and terminates in weight 240 which is provided with a shock absorbing spring 242. The cable 234 is secured in the weight 240 by four Allen set screws 243, two on either side of the weight 240. A guide 244 prevents undue lateral movement of the weight 240.

The other portion of the cable 234 passes over a second vertical pulley 246 through a second opening 248 in the horizontal plate 226 to a horizontal bar 250, which is secured to a movable carrier 252 maintained in a track 254 mounted along one side of the pillar 22. Details of the carrier 252 and its connection with the gate 42 will be described below. The track 254 is secured to the vertical member 22 by welding or by bolts 255.

The vertical pulleys 236, 246 are mounted in tandem, with a bolt 256 passing through the centers thereof and secured through a vertical mounting plate 258, which in turn is secured to the axial box beam 46, such as by bolts 259. A plate 260, which is secured to the horizontal plate 226, such as by welding, provides support for the opposite end of the bolt 256.

The spring-loaded counter-weight 240 serves to anchor the cable 234 at the other end from the horizontal bar 250/carrier 252. If any individual gate 42 stops for any reason, the presence of the counter-weight 240 prevents the cable 234 from ever becoming slack enough to come off any of the pulleys 216, 236, 246. The counter-weight 240 will keep the cable 234 taut at all times. The spring 242 acts as a shock absorber, so that when the gate 42 arrives at the end of its travel (raised or lowered), the spring 242 prevents a sudden stop, and acts as a cushion.

Figure 5:
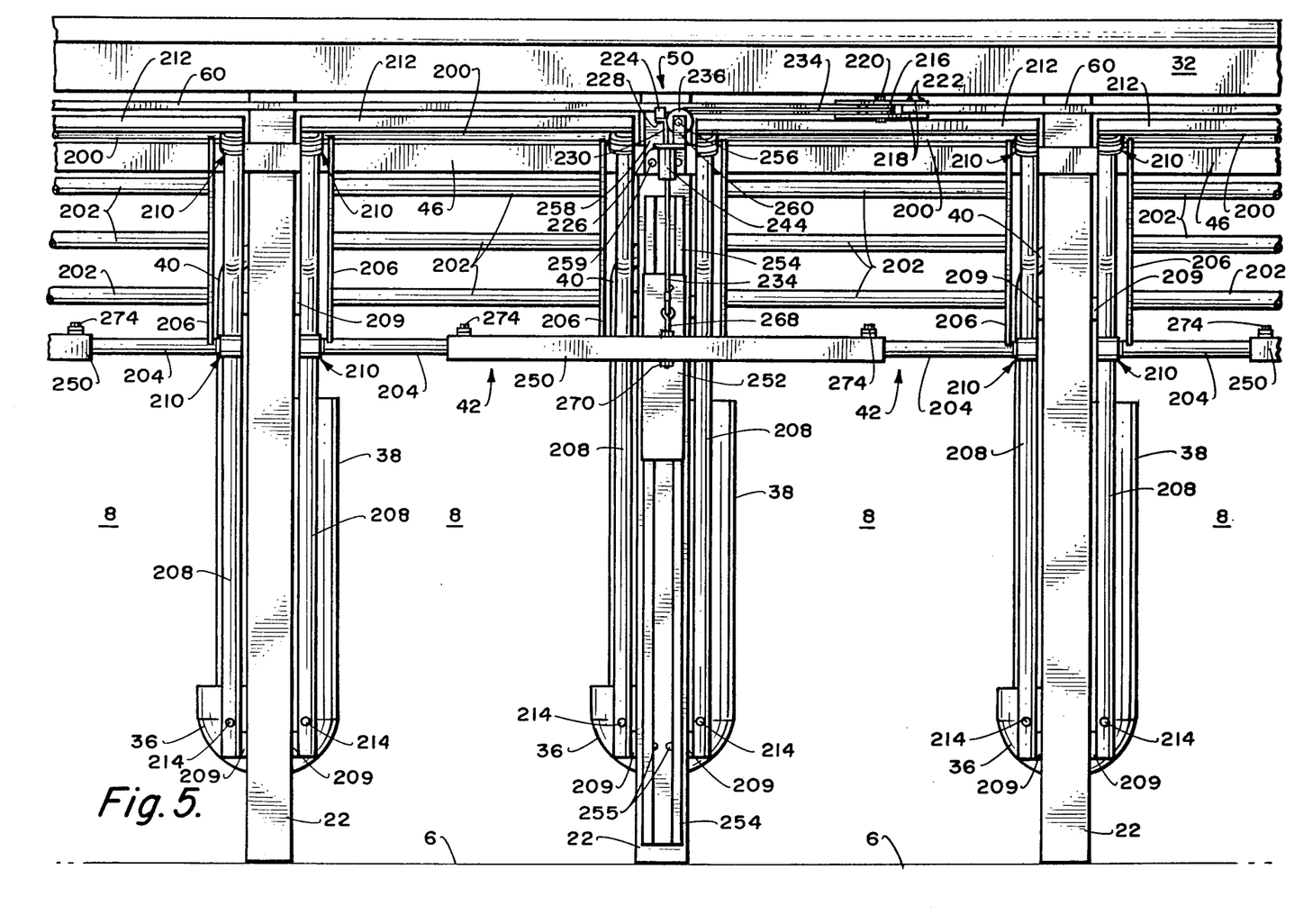
FIG. 5 is a view similar to that of FIG. 3, taken along the line 5—5 of FIG. 4.
Figure 6:
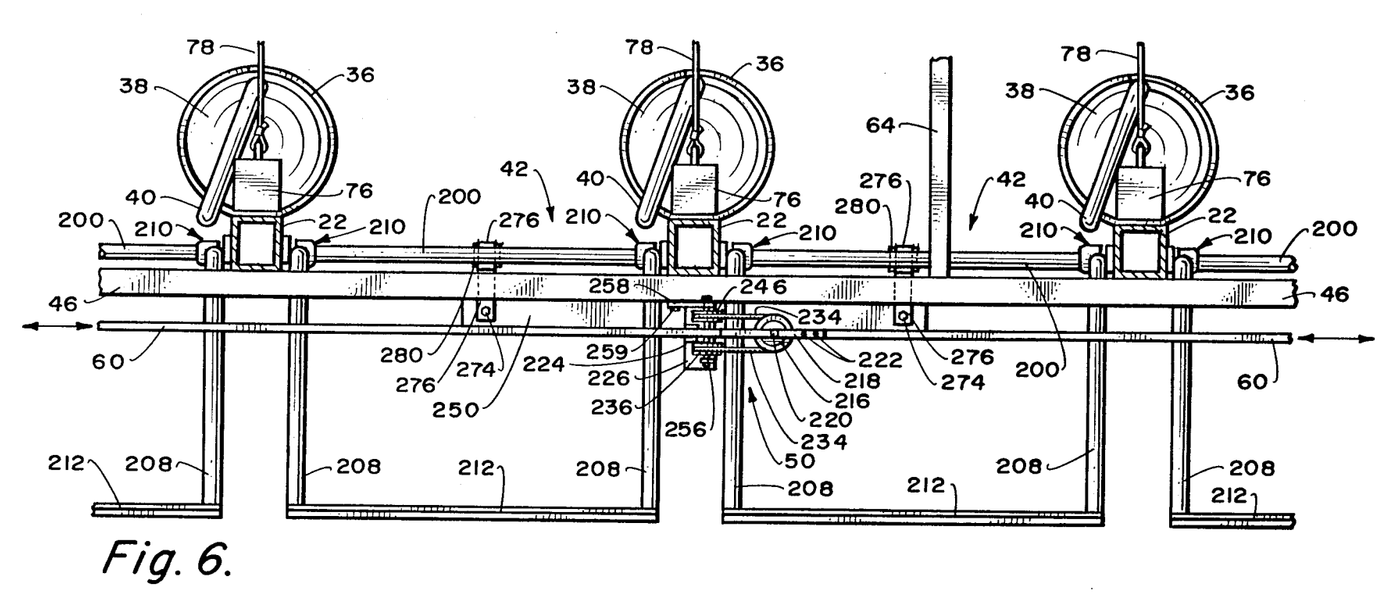
FIG. 6 is a top plan view taken along the line 6—6 of FIG. 2.
Figure 7:
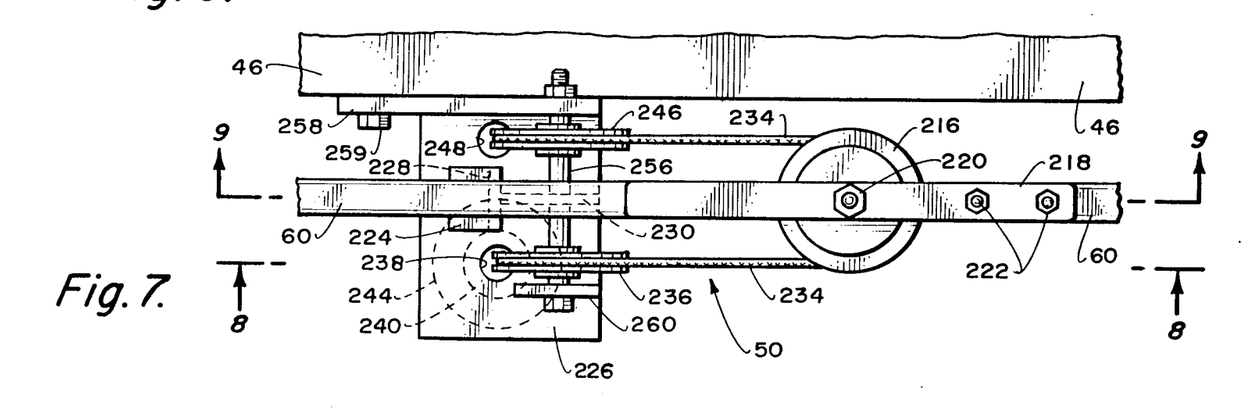
FIG. 7 is a top plan view of a portion of FIG. 3, taken along the line 7—7 of FIG. 3.
Figure 8:
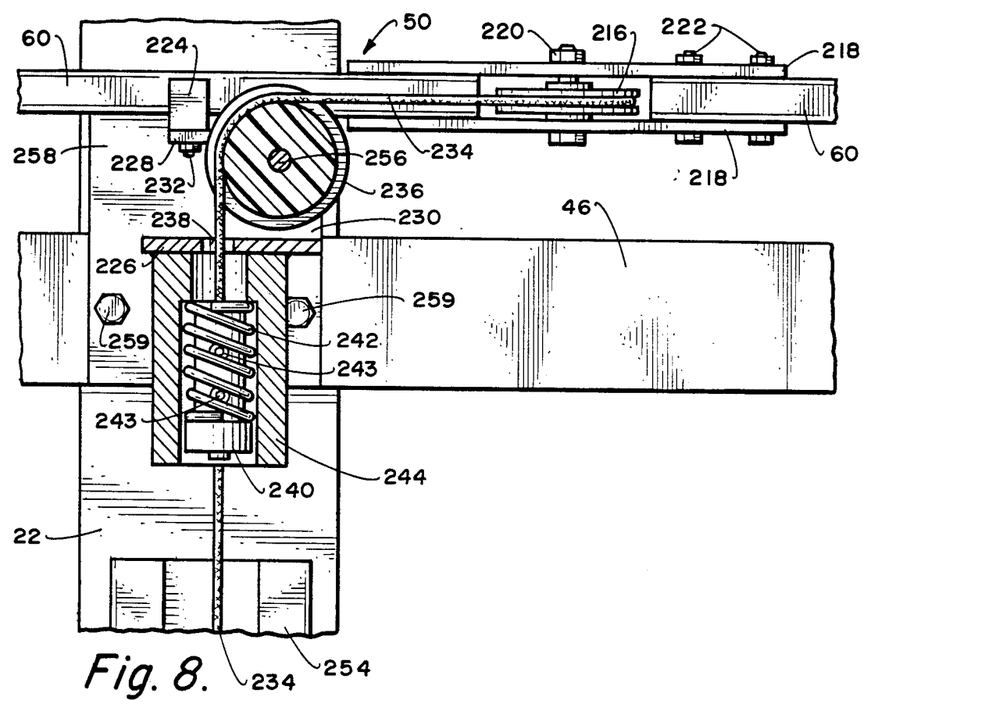
FIG. 8 is a side elevational view, partially in cross-section, taken along the line 8—8 of FIG. 7.
Figure 9:
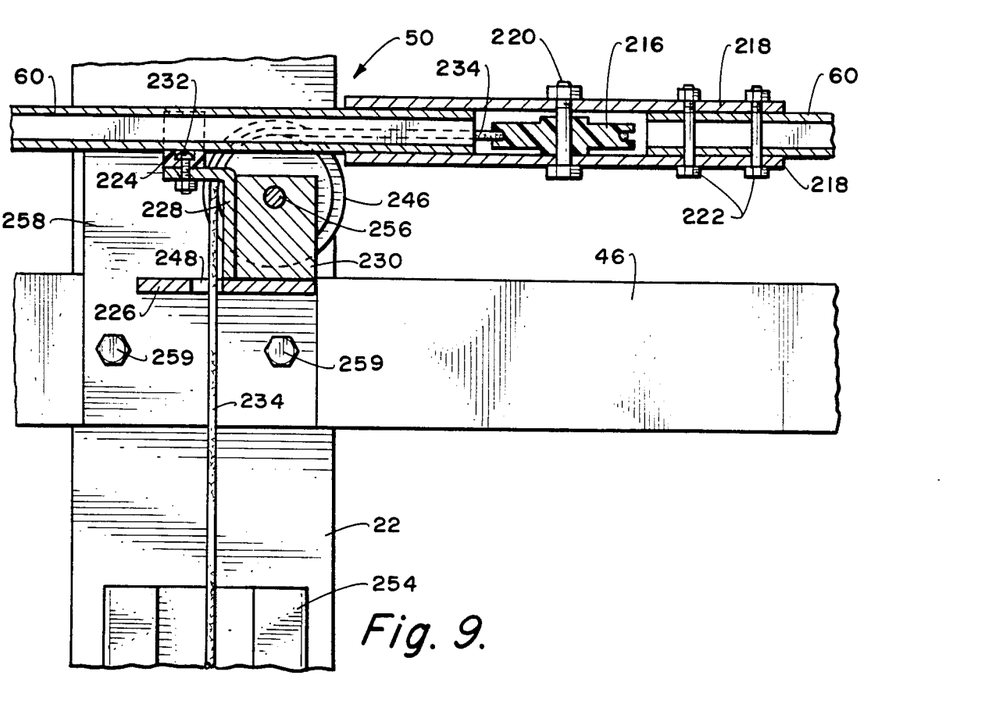
FIG. 9 is a side elevational view, partially in cross-section, taken along the line 9—9 of FIG. 7.
Figure 15:
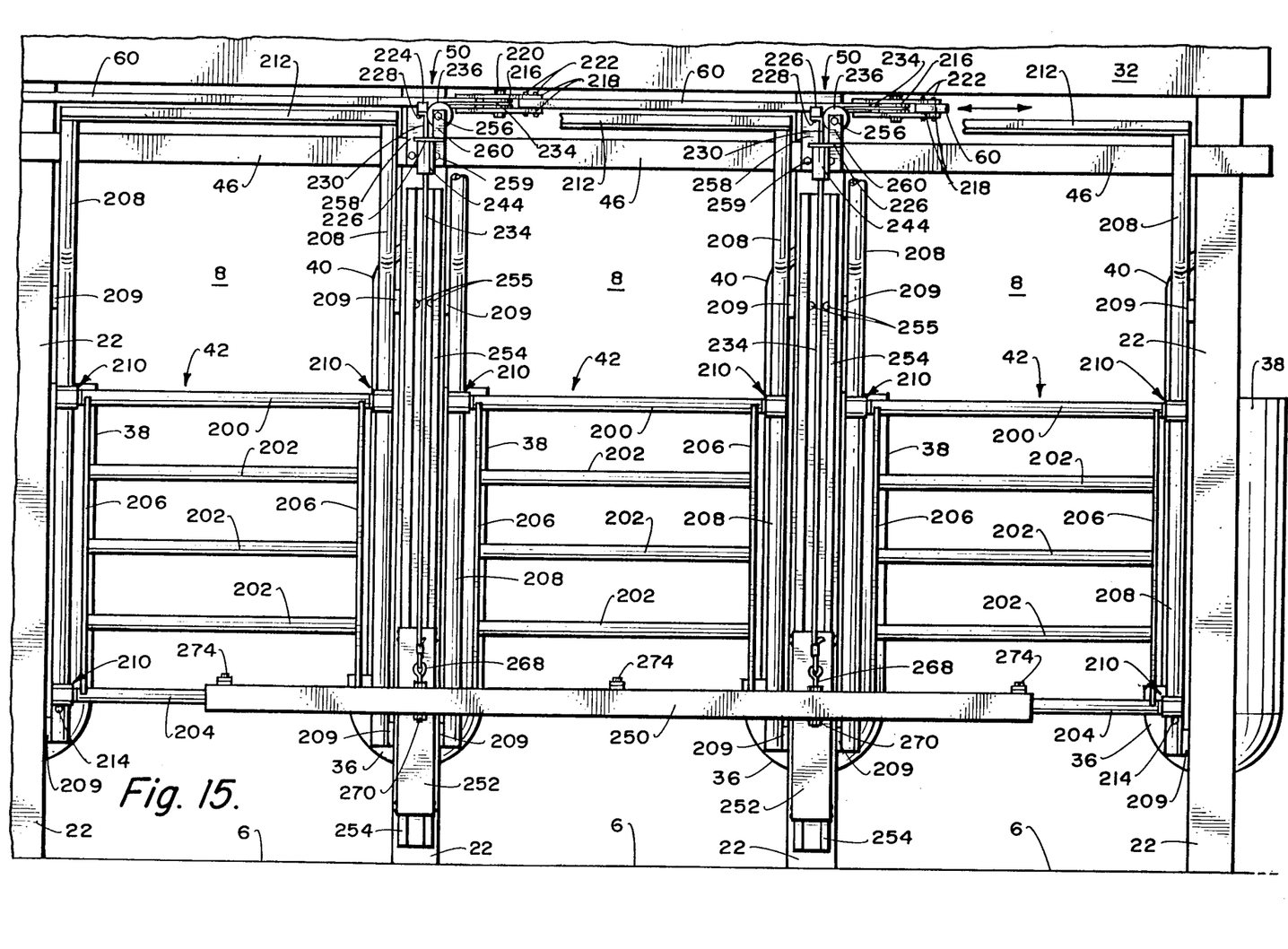
FIG. 15 is a view similar to that of FIG. 3, but showing a gate construction for an odd number of modules.

As indicated above, one end of the cable 234 is attached to the horizontal bar 250, which is secured to the movable carrier 252, which in turn is mounted in the track 254. There is one such track for each two modules, as shown in FIGS. 3 and 5, to control the gates of two modules, two such tracks, located on the inner two pillars 22 of three modules, may be employed, as shown in FIG. 15. In such a case, the three modules are desirably coupled at the end of a run.

Figure 13:
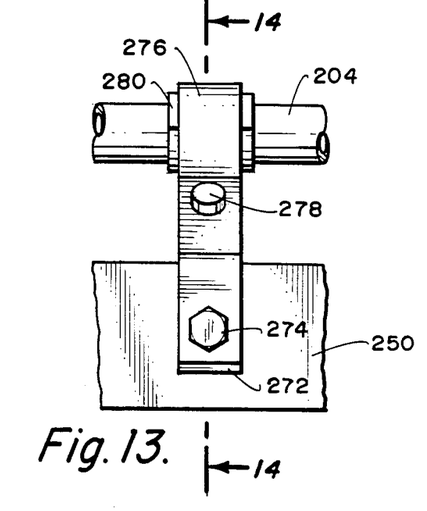
FIG. 13 is a top plan view of a portion of FIG. 3, taken along the line 13—13 of FIG. 3.
Figure 14:
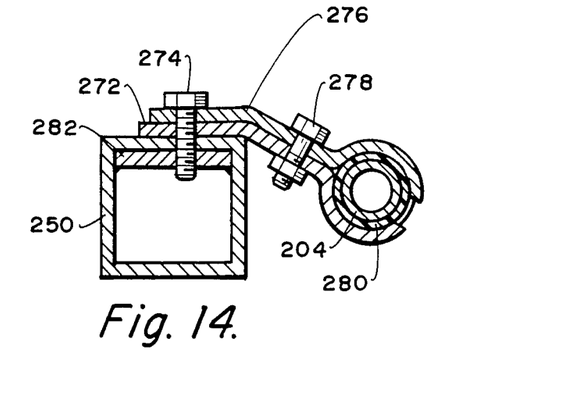
FIG. 14 is a cross-sectional view taken along the line 14—14 of FIG. 13.

Details of the gate lifting mechanism are provided in FIGS. 10, 13 and 14, while overall views are shown in FIGS. 2-5. The carrier 252 is secured to the horizontal bar 250, as by welding, as shown at weldments 261. Alternatively, and more preferably, the carrier 252 is secured to the horizontal bar 250 by threaded bolts 262, which pass through reinforcement plate 263, secured to the inside of the carrier 252, thence though the carrier 252 and into weld plate 265, secured inside the horizontal bar 250 and drilled and tapped to receive the threaded bolts 262.

The carrier 252 is provided with glides or wheels 264, comprised of a low-friction material, such as "Teflon" or nylon, attached to the carrier 252 by fastening means such as bolts 266. The cable 234 is attached to the horizontal bar 250 by fastening means such as hook 268, which is secured through the bar 250 by means such as bolt 270.

The glides or wheels 264 permit the carrier 252 to travel easily along the track 254. There are four such glides or wheels 264, two at each end of the carrier 252, on either side of the track 254.

Like vertical upright member 22, the carrier 252, track 254, horizontal bar 250 and other flat parts (or parts made from flat parts) conveniently comprise 12 gauge mild steel, galvanized. All corners are rolled, to prevent cutting or other damage to the cattle.

The horizontal bar 250 is coupled at either end to the lower horizontal member 204 of the gate 42 by a combination strap 272, fastened to the bar 250 by means such as threaded bolt 274, and a C-clamp 276, which is fastened to the strap 272 by means such as bolt 278. An inset guide 280 of low-friction material, such as "Teflon" or nylon, permits rotation of the lower horizontal member 204 with respect to the horizontal bar 250 during raising and lowering of the gate 42. A weld plate 282, welded to the inside of the bar 250, may be drilled and tapped to receive the threaded bolt 274.

Following feeding and milking of the cattle in the cattle stands 8, the gate 42, which is in the down position during this period of time, is raised. The actuating mechanism 50, such as air cylinder 62, causes the draw-rod 60 to move, thereby causing travelling pulley 216 to move with the draw-rod 60. By means of cable 234, the bar 250 is raised, guided by carrier 252 in track 254. Since bar 250 is coupled to two gates 42, both gates are caused to raise simultaneously. Of course, draw-rod 60 may be coupled to a plurality of pulleys 216, thereby causing a plurality of pairs of gates 42 to raise.

The length of the cable 234 is such that the upper horizontal member 200 of the gate 42 stops short of the cross-Lie 212, with the lower horizontal bar 204 still on the vertical portion of the bent guide 208. The spring-loaded counter-weight 240 prevents sudden jolts on the cable 234 when the gate 42 stops, as described above.

Following egross of the cattle, the gate 42 is lowered, with the draw-rod 60 returned to its original position, along with travelling pulley 216 and consequent lowering of the carrier 252 and horizontal bar 250. Stops 214 prevent further lowering of the gate 42.

Thus, there has been disclosed an improved milking parlor construction having a modular construction and provided with at least two upraising gates. The improved milking parlor construction is particularly suited for existing barns in which space for permitting cows to exit is limited. While specific construction and design materials have been alluded to, the same have been used for purposes of description only and are not to be taken as delimiting of the invention. Indeed, those of ordinary skill in the art will at once recognize various changes and modifications that may be made to the disclosed invention, and all such changes and modifications will not deviate from the spirit and essence of the invention and all are intended to be covered by the appended claims.

What is claimed is:

1. A milking parlor construction comprising in combination:
   (a) a module comprising at least two spaced-apart, hollow vertical upright members adapted for rigid securement in a base or the like;
   (b) a feed bowl means secured to each said hollow vertical upright member and defining a cattle feeding station;
   (c) a feed conveyor means superpositioned in stationary position to said hollow vertical upright members and adapted to deliver feed to said hollow vertical upright members defining a feed passageway having communication to said feed bowl means;
   (d) at least two pivoted gate members vertically upraisable and mounted on each said hollow vertical upright member and being adapted to move vertically and pivotally between an upper open and a lower closed position; and
   (e) means to move at least pairs of said gate members into a selected one of the open and closed positions.

2. The milking parlor construction in accordance with claim 1 including a plurality of the modules defined in claim 1 and each being in spaced and aligned relationship to define individual cattle receiving stations.

3. The milking parlor construction in accordance with claim 2 wherein said plurality of modules are laid out in a generally rectangular configuration having an intermediate milking pit with a cattle stand on either side thereof.

4. The milking parlor construction in accordance with claim 2 including remotely positioned means to open a pair or a selected plurality of said pivotal gate members.

5. The milking parlor construction in accordance with claim 4 wherein said pivotal gate members are pneumatically controlled.

6. The milking parlor construction in accordance with claim 1 wherein each said pivotal gate member comprises an upper horizontal bar, at least one intermediate horizontal bar and a lower horizontal bar, with said at least one intermediate horizontal bar secured to vertical side members which are in turn secured to said upper and lower horizontal bars, wherein said module includes at least two pairs of vertical bars, secured to said hollow vertical upright members and bent in toward said module at a height above that of cattle for guiding the movement of said pivotal gate member, and wherein said upper and lower horizontal bars are slidably engaged on said pair of vertical bars.

7. The milking parlor construction in accordance with claim 6 wherein the ends of said upper and lower horizontal bars are provided with a U-shaped member which partially encompasses said vertical bar, said U-shaped member including a substantially frictionless material in the bright thereof and further including an extension member for insertion into the interior of said horizontal bars, said extension member including a substantially frictionless sleeve material.

8. The milking parlor construction in accordance with claim 7 wherein said gate moving means includes a carrier slidably mounted in a vertical track secured to said vertical upright member, said carrier connected to gate moving means.

9. The milking parlor construction in accordance with claim 8 wherein said gate moving means further includes a horizontal rod secured to at least two pivotal gate members and coupled to said means for moving said two pivotal gate members into said open and closed positions.

10. The milking parlor construction in accordance with claim 9 wherein said means for moving said pivotal gate member into said open and closed positions comprises a laterally movable horizontal draw-rod mounted near the top of said module, adapted to carry at least one horizontally mounted travelling pulley, connected by a cable to said gate moving means.

11. The milking parlor construction in accordance with claim 10 wherein one end of said cable passes over a first vertically mounted pulley to said gate moving means and the other end of said cable passes over a second vertically mounted pulley to a spring-loaded counter-weight means.

12. (Amended) The milking parlor construction in accordance with claim 10 wherein one horizontally mounted travelling pulley is associated with two pivotal gate members and wherein said gate moving means is coupled to said two pivotal gate members.

13. (Amended) the milking parlor construction in accordance with claim 10 wherein two horizontally mounted travelling pulleys are associated with three pivotal gate members and wherein said gate moving means is coupled to said three pivotal gate members.

14. The milking parlor construction in accordance with claim 10 wherein said laterally moving horizontal draw-rod is coupled to pneumatic air movement means.

15. A milking parlor construction comprising in combination;
 (a) a module comprising at least two spaced-apart, hollow vertical upright members adapted for rigid securement in a base or the like;
 (b) a feed bowl means secured to each said hollow vertical upright member and defining a cattle feed station;
 (c) a feed conveyor means superpositioned in stationary position to said hollow vertical upright members and adapted to deliver feed to said hollow vertical upright members defining a feed passageway having communication to said feed bowl means;
 (d) at least two pivotal gate members vertically upraisable and mouned on each said hollow vertical upright member and being adapted to move between an upper angled open position and a lower vertical closed position, said pivotal gate members each including upper and lower horizontal bars;
 (e) at least two pairs of vertical bars associated with each module and secured to said hollow vertical upright members, bent in toward said module at a height above that of cattle for guiding the movement of each said pivotal gate members;
 (f) guide means rotatably mounted in the ends of said upper and lower horizontal bars of each said pivotal gate member and slidably engaged on a pair of said vertical bars; and
 (g) means to move at least pairs of said pivotal gate members into a selected one of the open and closed positions, said means including a laterally movable horizontal draw-rod mounted near the top of said module, means to translate horizontal motion of said draw rod into vertical motion, and a carrier slidably mounted in a vertical track secured to said vertical upright member, said carrier connected to said vertical motion translation means and to at least two said pivotal gate members through a horizontal rod secured to said at least two pivotal gate members.

16. The milking parlor construction in accordance with claim 15 wherein said guide means comprise a U-shaped member which partially encompasses said vertical bar, said U-shaped member including a substantially frictionless material in the bight thereof and further including an extension member for insertion into the interior of said horizontal bars, said extension member including a substantially frictionless sleeve material.

17. The milking parlor construction in accordance with claim 15 wherein said transiation means includes a horizontally mounted travelling pulley mounted on said laterally movable horizontal draw-rod and a cable adapted to engage said travelling pulley, one end of said cable being secured to said horizontal rod and the other end of said cable being secured to a spring-loaded counter-weight means, with a portion of said cable between its ends engaging vertically mounted pulleys to thereby translate said horizontal motion into vertical motion.

18. The milking parlor construction in accordance with claim 15 wherein one horizontally mounted travelling pulley is associated with two pivotal gate members and wherein said gate moving means is coupled to said two pivotal gate members.

19. The milking parlor construction in accordance with claim 15 wherein two horizontally mounted travelling pulleys are associated with three pivotal gate members and wherein said gate moving means is coupled to said three pivotal gate members.

20. A milking parlor construction comprising in combination a plurality of modules each being in spaced and aligned relationship to define individual cattle receiving stations, said plurality of modules being laid out in a generally rectangular configuration having an intermediate milking pit with a cattle stand on either side thereof comprising in combination;
 (a) a module comprising at least two spaced apart, hollow vertical upright members adapted for rigid securement in a base or the like;
 (b) a feed bowl means secured to each hollow vertical upright member and defining a cattle feeding station;
 (c) a feed conveyor means superpositioned in stationary position to said hollow vertical upright members and adapted to deliver feed to said hollow vertical upright members defining a feed passageway having communication to said feed bowl means;
 (d) at least two gate members vertically upraisable and mounted on each said hollow vertical upright member and being adapted to move between an upper open and a lower closed position;
 (e) remotely positioned means to move at least pairs of said gate members into a selected one of the open and closed positions and wherein said gate members are pneumatically controlled.

21. A milking parlor construction comprising in combination:
 (a) a module comprising at least two spaced apart, hollow vertical upright members adapted for rigid securement in a base or the like;
 (b) a feed bowl means secured to each said hollow vertical upright member and defining a cattle feeding station;
 (c) a feed conveyor means superpositioned in stationary position to said hollow vertical upright members and adapted to deliver feed to said hollow vertical upright members defining a feed passageway having communication to said feed bowl means;
 (d) at least two gate members vertically upraisable and mounted on each said hollow vertical upright member and being adapted to move between an upper open and a lower closed position;
 (e) remotely positioning means to move at least pairs of said gate members into a selected one of the open and closed positions and wherein each of said gate members comprises an upper horizontal bar, at least one intermediate horizontal bar and a lower horizontal bar, with said at least one intermediate horizontal bar secured to vertical side members which are in turn secured to said upper and lower horizontal bars, wherein said module includes at least two pairs of vertical bars, secured to said hollow vertical upright members and bent in toward said module at a height above that of cattle for guiding the movement of said gate member, and wherein said upper and lower horizontal bars are slidably engaged on said pair of vertical bars, the ends of said upper and lower horizontal bars being provided with a U-shaped member which partially encompasses said vertical bar, said U-shaped member including a substantially frictionless material in the bight thereof and further including an extension member for insertion into the interior of said horizontal bars, said extension member including a substantially frictionless sleeve material and wherein gate moving means includes a carrier slidably mounted in a vertical track secured to said vertical upright member, said carrier connected to gate moving means wherein said gate moving means further include a horizontal rod secured to at least two gate members and coupled to said means for moving said two gate members into said open and closed positions and wherein said means for moving said gate member into said open and closed positions comprises a laterally movable horizontal draw-rod mounted near the top of said module, adapted to carry at least one horizonally mounted travelling pulley, connected by a cable to said gate moving means and wherein two horizonally mounted travelling pulleys are assocated with three gate members and wherein said gate moving means is coupled to said three gate members.

22. A milking parlor construction comprising in combination:
(a) a module comprising at least two spaced apart, hollow vertical upright members adapted for rigid securement in a base or the like;
(b) a feed bowl means secured to each said hollow vertical upright member and defining a cattle feeding station;
(c) a feed conveyor means superpositioned in stationary position to said hollow vertical upright members and adapted to deliver feed to said hollow vertical upright members defining a feed passageway having communication to said feed bowl means;
(d) at least two gate members vertically upraisable and mounted on each said hollow vertical upright member and being adapted to move between an upper open and a lower closed position;
(e) remotely positioning means to move at least pairs of said gate members into a selected one of the open and closed positions and wherein each of said gate members comprises an upper horizontal bar, at least one intermediate horizontal bar and a lower horizontal bar, with said at least one intermediate horizontal bar secured to vertical side members which are in turn secured to said upper and lower horizontal bars, wherein said module includes at least two pairs of vertical bars, secured to said hollow vertical upright members and bent in toward said module at a height above that of cattle for guiding the movement of said gate member, and wherein said upper and lower horizontal bars are slidably engaged on said pair of vertical bars, the ends of said upper and lower horizontal bars being provided with a U-shaped member which partially encompasses said vertical bar, said U-shaped member including a substantially frictionless material in the bight thereof and further including an extension member for insertion into the interior of said horizontal bars, said extension member including a substantially frictionless sleeve material and wherein gate moving means includes a carrier slidably mounted in a vertical track secured to said vertical upright member, said carrier connected to gate moving means wherein said gate moving means further include a horizontal rod secured to at least two gate members and coupled to said means for moving said two gate members into said open and closed positions and wherein said means for moving said gate member into said open and closed positions comprises a laterally movable horizontal draw-rod mounted near the top of said module, adapted to carry at least one horizonally mounted travelling pulley, connected by a cable to said gate moving means and wherein said laterally moving horizontal draw-rod is coupled to pneumatic air movement means.

* * * * *